(12) United States Patent
Hunter

(10) Patent No.: US 11,028,825 B2
(45) Date of Patent: Jun. 8, 2021

(54) MODULAR WIND TURBINE BLADES

(71) Applicant: Vestas Wind Systems A/S, Aarhus N. (DK)

(72) Inventor: Robert Hunter, Cowes (GB)

(73) Assignee: Vestas Wind Systems A/S, Aarhus N. (DK)

( * ) Notice: Subject to any disclaimer, the term of this patent is extended or adjusted under 35 U.S.C. 154(b) by 496 days.

(21) Appl. No.: 15/578,948

(22) PCT Filed: Jun. 8, 2016

(86) PCT No.: PCT/DK2016/050169
§ 371 (c)(1),
(2) Date: Dec. 1, 2017

(87) PCT Pub. No.: WO2016/198075
PCT Pub. Date: Dec. 15, 2016

(65) Prior Publication Data
US 2018/0171968 A1 Jun. 21, 2018

(30) Foreign Application Priority Data
Jun. 9, 2015 (GB) .................................... 1509991

(51) Int. Cl.
*F03D 1/06* (2006.01)

(52) U.S. Cl.
CPC ......... *F03D 1/0675* (2013.01); *F03D 1/0633* (2013.01); *F05B 2230/60* (2013.01);
(Continued)

(58) Field of Classification Search
CPC ... F03D 1/0675; F03D 1/0633; Y02E 10/721; Y02P 70/523; F05B 2230/60;
(Continued)

(56) References Cited

U.S. PATENT DOCUMENTS 5,547,629 A * 8/1996 Diesen .................. B29C 33/505
264/257
7,998,303 B2 * 8/2011 Baehmann ............ F03D 1/0675
156/293

(Continued)

FOREIGN PATENT DOCUMENTS

DE  10235496 A1  2/2004
EP  2534373 B1  12/2012

(Continued)

OTHER PUBLICATIONS

European Patent Office, Examination Report in EP Application No. 16729769.6, dated May 4, 2020.
(Continued)

*Primary Examiner* — Galen H Hauth
(74) *Attorney, Agent, or Firm* — Wood Herron & Evans LLP

(57) ABSTRACT

A modular wind turbine blade is described. The modular wind turbine blade comprises first and second blade modules having spar caps embedded within their outer shells. The spar caps taper in thickness resulting in tapered recesses being defined in the outer shells. The tapered recesses in the first and second blade modules are aligned when the modules are placed end-to-end to form a continuous double-tapered channel. A connecting member having a double-tapered structure is bonded in the channel to connect the modules together. The invention also provides a mould for making the blade modules in which the mould surface includes a protruding elongate feature having a tapered portion configured to form the recesses in the outer shells. During layup and moulding of the outer shells, spar caps are supported on top of the tapered portion of the elongate feature.

12 Claims, 7 Drawing Sheets

(52) U.S. Cl.
  CPC ... *F05B 2240/302* (2013.01); *F05B 2250/292* (2013.01); *F05B 2280/6003* (2013.01); *Y02E 10/72* (2013.01); *Y02P 70/50* (2015.11)

(58) Field of Classification Search
  CPC .......... F05B 2240/302; F05B 2250/292; F05B 2280/6003
  See application file for complete search history.

(56) References Cited

U.S. PATENT DOCUMENTS

| | | | |
|---|---|---|---|
| 9,039,381 B2* | 5/2015 | Grife | F03D 1/0675 416/236 R |
| 9,873,501 B2* | 1/2018 | Landry | B29C 65/5078 |
| 2014/0301855 A1 | 10/2014 | Busbey et al. | |

FOREIGN PATENT DOCUMENTS

| | | | | |
|---|---|---|---|---|
| EP | 2591230 B1 | 5/2013 | | |
| EP | 2634418 A2 | 9/2013 | | |
| WO | 2012004571 A2 | 1/2012 | | |
| WO | WO-2013097859 A2 * | 7/2013 | ......... | B29D 99/0025 |
| WO | 2015067637 A1 | 5/2015 | | |

OTHER PUBLICATIONS

European Patent Office, International Search Report and Written Opinion in PCT Application No. PCT/DK2016/050169, dated Sep. 8, 2016.

Intellectual Property Office, Combined Search and Examination Report in GB1509991.4, dated Jan. 14, 2016.

\* cited by examiner

MODULAR WIND TURBINE BLADES

BACKGROUND

The present invention relates generally to modular rotor blades for wind turbines.

Modern wind turbines are designed and manufactured to capture increasingly more energy from the wind to generate power. One way of increasing the energy capture of a wind turbine is to increase the swept area of the rotor blades, which means increasing the length of the rotor blades.

In general, large wind turbines are assembled on site from components that are transported to the site. Typical components of a wind turbine include a plurality of rotor blades, a rotor hub, a nacelle and a tower. The site may be remote and difficult to access, which makes transportation of large components, in particular the long rotor blades, problematic. To resolve this problem, the rotor blades may be divided into two or more modules that are easier to transport, and which are connected together on site.

One of the key challenges associated with modular wind turbine blades is ensuring that the blade is sufficiently strong across the joint between the blade modules. Another key challenge is ensuring that the blade modules are precisely aligned, particularly where the modules are to be bonded together. Ensuring precise alignment between blade modules can be difficult when assembling the blade in the field, and if the modules are not precisely aligned then this can reduce the strength of the blade across the interface between the blade modules.

Current methods of assembling modular wind turbine blades can be relatively complicated and time-consuming, and hence there is a need for more straightforward assembly procedures that can be performed easily and efficiently on site.

Against this background, the present invention aims to provide an improved modular wind turbine blade, which is both strong and easy to assemble. The invention also aims to provide an associated process for manufacturing blade modules of a modular wind turbine blade.

SUMMARY OF THE INVENTION

According to the invention there is provided a modular wind turbine blade comprising first and second blade modules connected together by an elongate connecting member, each blade module comprising:

an outer shell having a laminate structure, the outer shell defining an outer surface of the blade module, and a connecting region of the outer shell defining an interface end of the blade module;

a longitudinal spar structure embedded in the laminate structure of the outer shell, the spar structure having a tapered portion in the connecting region of the outer shell, the thickness of the tapered portion decreasing progressively moving towards the interface end of the blade module, such that a tapered recess is defined in the outer surface of the blade module in the connecting region, the tapered recess accordingly having a depth relative to the outer surface of the blade module that increases progressively moving towards the interface end of the blade module;

wherein the first and second blade modules are arranged end-to-end with their respective interface ends in abutment and their respective tapered recesses aligned to define a continuous double-tapered channel spanning the connecting regions of the first and second blade modules, wherein the elongate connecting member has a double-tapered structure comprising first and second tapered ends, the double-tapered structure being complementary in shape to the double-tapered channel, and wherein the elongate connecting member is bonded in the double-tapered channel and bridges the longitudinal spar structures of the first and second blade modules thereby connecting the blade modules together.

The tapered ends of the connecting member form scarf joints with the tapered recesses of each blade module, and hence with the tapered portions of the embedded spar structures of the respective blade modules. Accordingly, a double-scarf joint is formed between the connecting member and the respective blade modules. The scarf joints provide large bond areas and result in a very strong connection being formed between the blade modules.

The blade modules preferably comprise spanwise sections of the wind turbine blade. The blade may have two or more blade modules connected together by means of elongate connecting members according to the present invention. In preferred embodiments of the invention, the first blade module comprises an inboard portion of the wind turbine blade, and the second blade module comprises an outboard portion of the wind turbine blade. The second blade module may comprise the tip of the wind turbine blade or the tip may be attached to an end of the second blade module.

Typically each blade module includes a plurality of spar structures embedded in its outer shell. The spar structures are commonly referred to as 'spar caps'. Generally each blade module comprises one or more embedded spar structures on a windward side of the outer shell, and one or more embedded spar structures on a leeward side of the outer shell. The spar structures on the windward and leeward sides are arranged opposite one another. One or more shear webs are preferably bonded inside the outer shell of each blade module between opposed spar structures. The shear webs of each blade module may have an I-shaped cross-section, consisting of a longitudinally-extending web having transverse flanges along its upper and lower edges. The flanges are bonded respectively to the opposed spar structures, i.e. the spar caps, of the blade modules. In preferred embodiments, the shear webs have a flat end surface adjacent the interface end of the blade module. This flat end surface is referred to herein as a 'box end', and is arranged in a plane substantially perpendicular to both the web and flanges of the shear web.

Accordingly, each blade module may include a plurality of tapered recesses (for example each spar structure of the blade module may have a tapered portion at the interface end of the blade module defining a corresponding tapered recess in the outer shell). The blade modules may therefore be connected together using a plurality of elongate connecting members. Generally each blade module comprises one or more tapered recesses on a windward side of the outer shell, and one or more tapered recesses on a leeward side of the outer shell. The blade modules are therefore preferably connected by one or more connecting members on the windward side of the blade and one or more connecting members on the leeward side of the blade.

The connecting member(s) advantageously form a continuation of the embedded spar structures and bridge the first and second modules. Accordingly, once bonded in the double-tapered channel(s) formed by the aligned recesses of the respective blade modules, the connecting members are then themselves embedded within the structure of the outer shells of the blade modules.

Preferably the connecting members are pre-cured composite structures. For example, the connecting members may comprise a plurality of strips of pre-cured fibre-reinforced composite material. These strips are preferably formed by pultrusion, and are referred to herein as 'pultrusions' or 'pultruded strips'. Carbon fibres are preferred as the reinforcing fibres, due to their high strength-to-weight ratio, and such strips are referred to herein as 'carbon pultrusions'. The strips (e.g. the carbon pultrusions) are preferably arranged in a stack and bonded together by a cured matrix material such as epoxy to form an integrated stack. Accordingly, the connecting members preferably comprise one or more integrated stacks of pre-cured pultruded strips, most preferably carbon pultrusions.

The connecting member(s) are preferably formed from the same or substantially the same material as the embedded spar structures. This advantageously results in the properties of the spar structures (e.g. the strength, weight, flexibility, load-bearing capacity etc.) being substantially continuous through the joint between the blade modules. Accordingly, the spar caps preferably comprise one or more stacks of pultruded strips, such as carbon pultrusions.

In preferred embodiments, the tapered recess of each blade module has a substantially constant depth in a portion of the recess adjacent to the interface end of the blade module. This portion of the recess is conveniently referred to herein as a 'flat portion'. In preferred embodiments, the flat portion of the recess is achieved by the tapered portion of the corresponding embedded spar structure terminating before the interface end of the blade module (i.e. stopping short of the interface end). The tapered portion of the embedded spar structure is preferably an end portion of the embedded spar structure, or in other words the embedded spar structure preferably has a tapered end portion. However, in other embodiments, the embedded spar structure may have a portion of substantially constant thickness adjacent to the interface end of the blade module, i.e. between the tapered portion of the spar structure and the interface end. This arrangement also would result in the recess having a flat portion adjacent to the interface end of the blade module.

The flat portions of the recesses of the respective blade modules are preferably of substantially the same depth. Accordingly, the double-tapered channel formed by the aligned recesses of the respective blade modules includes an intermediate section of substantially constant depth (i.e. a 'flat section') spanning the respective blade modules.

The connecting member accordingly preferably has an intermediate section of substantially constant thickness/height between its respective tapered ends. This intermediate section sits substantially flush against the flat portion of the double-tapered channel, and is bonded thereto, whilst the tapered ends of the connecting member sit flush against, and are bonded to, the tapered end portions of the double-tapered channel. This configuration provides a particularly strong connection between the blade modules.

The first and/or the second blade modules may include an interface plate, such as a bulkhead, at the interface end. The interface plates provide substantially flat surfaces at the interface ends of the respective blade modules. The interface plates abut one another and are bonded together by means of adhesive. The interface plates serve to reinforce and protect the interface ends of blade modules during transit and assembly of the modular blade. The interface plates also provide additional structural support at the interface between the blade modules in the finished blade. In this respect, the interface plates bridge the shear webs of the respective blade modules and provide shear supports at the interface. The box ends of the shear webs preferably abut the interface plate of the respective blade module and are bonded thereto. The interface plates further provide advantages during the manufacture of the blade modules as will be discussed later.

The modular wind turbine blade preferably includes a cap bonded over the connecting member. The cap preferably covers the connecting member and the joint between the respective blade modules. The cap is preferably a pre-cured element. In preferred embodiments the cap is formed from glass-fibre fabric in a pre-cured matrix. The cap forms part of an outer skin of the respective blade modules and hence is substantially flush with the outer surface of the respective blade modules. Accordingly, the height/thickness of the connecting member is preferably slightly less than the depth of a groove to accommodate the cap. The cap serves to conceal the joint between the blade modules and protect the joint from environmental conditions. The cap also ensures that the outer surface of the blade is smooth and aerodynamically efficient.

The modular wind turbine blade of the present invention is preferably constructed as a plurality of individual blade modules, which are assembled on site, e.g. at a wind farm location, prior to being installed on a wind turbine structure. Constructing the blade from individual blade modules facilitates transportation of the wind turbine blade and allows longer blades to be installed, where it would not be feasible to transport such long blades as a single unit by conventional means.

The present invention therefore extends to the individual blade modules of the modular wind turbine blade described above.

Accordingly, the present invention also provides a blade module for a modular wind turbine blade, the blade module comprising:

an outer shell having a laminate structure, the outer shell defining an outer surface of the blade module, and a connecting region of the outer shell defining an interface end of the blade module; and a longitudinal spar structure embedded in the laminate structure of the outer shell, the spar structure having a tapered portion in the connecting region of the outer shell, the thickness of the tapered portion decreasing progressively moving towards the interface end of the blade module, such that a tapered recess is defined in the outer surface of the blade module in the connecting region, the tapered recess accordingly having a depth relative to the outer surface of the blade module that increases progressively moving towards the interface end of the blade module.

Optional and advantageous features discussed above in relation to the invention when expressed in terms of a modular wind turbine blade also of course apply to the invention when expressed in terms of a blade module for a modular wind turbine blade. Repetition of such features is avoided purely for reasons of conciseness.

The present invention also provides an associated method of assembling a modular wind turbine blade from first and second blade modules, wherein the method comprises:

providing first and second blade modules, each blade module comprising an outer shell having a laminate structure, the outer shell defining an outer surface of the blade module, and a connecting region of the outer shell defining an interface end of the blade module; and a longitudinal spar structure embedded in the laminate structure of the outer shell, the spar structure having a tapered portion in the connecting region of the outer shell, the thickness of the tapered portion decreasing progressively moving towards the interface end of the blade module, such that a tapered recess is defined in the outer surface of the blade module in the connecting region, the tapered recess accordingly having a depth relative to the outer surface of the blade module that increases progressively moving towards the interface end of the blade module, arranging the first and second blade modules end-to-end with their respective interface ends in abutment and their respective tapered recesses aligned to form a continuous double-tapered channel spanning the connecting regions of the first and second blade modules;

providing an elongate connecting member having a double-tapered structure comprising first and second tapered ends, the double-tapered structure being complementary in shape to the double-tapered channel;

inserting the elongate connecting member into the double-tapered channel; and bonding the elongate connecting member in the double-tapered channel.

The method is preferably performed on-site, for example at or near a wind farm location where the blade is to be installed on a wind turbine structure.

The novel design of the blade modules of the present invention facilitates assembly of the modular wind turbine blade on site. In particular, the tapered recesses in the respective blade modules provide a convenient and reliable means of aligning the blade modules together. Ensuring the correct alignment between blade modules is of paramount importance and is greatly facilitated by these recesses.

The elongate connecting member is preferably sized to form a close fit inside the double-tapered channel. This further ensures precise alignment between the blade modules as incorrect alignment may beneficially prevent insertion of the connecting member in the channel.

An adhesive is preferably used to bond the connecting member in the double-tapered channel. The method preferably involves applying the adhesive to the channel and/or to the elongate connecting member prior to inserting the connecting member in the channel. The adhesive is preferably a film adhesive. The method preferably involves applying heat locally to cure the adhesive. Preferably heater pads are used, and these may be conveniently positioned over the connecting member.

The bonded joint is easy to inspect and may be tested at this stage using any suitable non-destructive testing techniques known in the art.

As discussed previously, the blade modules may include an interface plate such as a bulkhead at their interface ends. The method may further comprise bonding the respective interface plates together. Accordingly, the method may comprise applying adhesive to one or both interface plates. A paste adhesive is preferred for this.

The method may further comprise bonding a cap over the connecting member. As discussed previously, the cap forms part of the outer skin of the blade. A film adhesive is preferred for this. The method preferably involves applying heat locally to cure the adhesive. Preferably heater pads are used, and these may be conveniently positioned over the cap.

The bonding processes described above are all straightforward and the wind turbine blade is accordingly easy to assemble on site.

The invention also provides a new manufacturing method for constructing blade modules, as will now be described in relation to a further aspect of the invention.

Accordingly, the invention also provides a method of making one or more blade modules of a modular wind turbine blade, the method comprising:

providing a mould assembly comprising a mould having a mould surface shaped to define at least part of an outer shell of a first blade module, and an elongate feature protruding from the mould surface, the elongate feature having a tapered end region defining an inclined upper surface;

arranging one or more first layers of fibrous material on the mould surface to form an outer skin of the first blade module, the one or more first layers at least partially covering the elongate feature;

arranging an elongate spar structure on top of the one or more first layers, the elongate spar structure having a tapered portion that tapers in reverse to the tapered end region of the elongate feature;

arranging the tapered portion of the elongate spar structure over the inclined upper surface of the elongate feature;

arranging one or more second layers of fibrous material on top of the one or more first layers and on top of the elongate spar structure to form an inner skin of the first blade module;

integrating the one or more first layers, the one or more second layers and the elongate spar structure by means of a curable matrix material;

curing the matrix material to form the outer shell of the first blade module;

wherein the elongate feature of the mould assembly forms a tapered recess in the outer shell of the first blade module.

It will be appreciated that the above method results in a blade module having an outer shell of laminate construction with a spar structure embedded in the laminate structure. As discussed previously, the spar structure is commonly referred to in the art as a 'spar cap'.

The various components of the outer shell may be integrated using any suitable techniques known in the art of composites moulding. For example, infusion or prepreg techniques may be used. Vacuum-assisted infusion is particularly preferred. This involves arranging a vacuum film over the mould surface to create a sealed region encapsulating the various components. Air is then removed from this region and the matrix material is admitted. The matrix material is preferably a suitable resin such as epoxy. This infuses throughout the various layers. The resin hardens when cured to bond the various layers together.

The above method may therefore be used to form the blade modules discussed above, and the tapered recesses of the modules are formed by the protruding elongate feature in the mould. Accordingly, the tapered recesses of the blade modules are moulded in the outer shells of the modules.

The protruding elongate feature may be an integral part of the mould, for example it may be a moulded formation, such as a moulded portion of the mould surface. Alternatively, the elongate feature may be provided as a separate element in the mould. This advantageously allows conventional blade moulds to be readily adapted to form modular wind turbine blades, without any permanent modification of the moulds being required. Expressed in other terms, the same mould can be used to make modular blades or one-piece blades.

The method may comprise bonding or otherwise securing the elongate feature to the mould surface. This ensures that the elongate feature remains in the correct position during the moulding process.

In certain embodiments, the elongate feature may be an elongate connecting member, i.e. the connecting member described previously, which is used to connect the first and second blade modules together. This solution advantageously results in a moulded recess having the exact dimensions of the connecting member.

The protruding elongate feature preferably has a substantially flat portion of substantially constant height adjacent the tapered end portion. This portion of the elongate feature defines the flat portion of the recess adjacent the interface end of the blade module that was discussed previously. Preferably the spar structure is arranged in the mould such that it terminates at the boundary between the tapered end portion and the flat portion of the elongate feature.

The spar structure is preferably formed from one or more stacks of strips of reinforcing material. For example carbon pultrusions as described previously. The strips may be stacked and bonded together to form the spar structure prior to arranging the spar structure in the mould. Alternatively, the method may comprise forming the spar structure by stacking the strips in the mould. The latter method is preferred as it allows for more convenient handling, and optimal structural integration of the strips in the laminate structure of the shell.

The tapered end portion of the spar structure is preferably formed by stacking strips of progressively increasing length in the mould. For example, the lowermost strip adjacent to the one or more first layers may be the shortest strip, and then strips of increasing length may be stacked on top to form a taper in reverse to the tapered end region of the elongate protruding feature in the mould. Preferably the end portions of the strips are also tapered or 'chamfered' to reduce stress concentrations in the stacked strips.

The strips preferably have a substantially rectangular cross section, resulting from a rectangular pultrusion die. The strips typically have a height of a few millimetres. The stacks may comprise any number of strips according to the required strength and thickness of the blade shell. Typically the stack may include five or more strips. The strips may be very long in length, as the pultrusion process conveniently allows continuous strips of any length to be formed. The strips preferably extend along a majority of the length of the blade modules. In preferred embodiments, each spar structure is formed from a plurality of stacks, preferably three, arranged side-by-side.

The mould assembly may be configured to form part of the outer shell or the entire outer shell of the first blade module. In preferred embodiments the outer shell is moulded in two halves: a windward half and a leeward half. Each half shell is moulded in a respective mould (i.e. a mould half) of the mould assembly. The mould halves are preferably arranged side by side, and once the respective half shells have been cured, adhesive may be applied to one or both half shells and one of the half moulds may be lifted, turned, and placed on top of the other mould half to bond the respective half shells together. This process is referred to as 'closing the mould'.

Both the windward and leeward mould halves may include one or more protruding elongate features, as defined above, arranged to form moulded recesses in the respective moulded half shells. The method of forming the outer shells of the windward and leeward halves is substantially identical, and each half shell may contain one or more spar structures, i.e. spar caps, embedded within its structure. The spar caps are arranged in the respective half shells such that when the half shells are bonded together to form the complete blade module, the spar caps in the windward half shell are located opposite the spar caps in the leeward half shell.

The method preferably comprises bonding a shear web to the spar structure. For example the method may comprise bonding the shear web between opposed spar caps of the windward and leeward half shells. For example, prior to bonding the half shells together, e.g. with the mould still open, the method may comprise bonding a shear web to the inner surface of one of the half shells. Adhesive may then be applied along an upper edge of the shear web before closing the mould to bond the shear web to the inner surface of the other half shell at the same time as bonding the two half shells together.

The first and second blade modules of the modular wind turbine blade may be formed in separate mould assemblies. Alternatively, in a particularly advantageous embodiment of the method, the first and second blade modules are formed in the same mould assembly.

Accordingly, the mould surface may have a first portion shaped to form at least part of the outer shell of the first blade module, and a second portion shaped to form at least part of the outer shell of the second blade module.

The first portion and the second portion of the mould surface are preferably located in adjacent spanwise sections of the mould.

The first and second portion may comprise respective elongate protruding features for forming respective recessed channels in the respective outer shells of the first and second blade modules. Alternatively, the mould may include a common elongate protruding feature spanning the first and second portions of the mould surface. In this way, the common elongate protruding feature is arranged to form a tapered recess in the outer shell of the first blade module and a tapered recess in the outer shell of the second blade module. The common elongate protruding feature preferably has a tapered first end protruding from the first portion of the mould surface and a tapered second end protruding from the second portion of the mould surface. The common elongate feature also preferably includes an intermediate section of substantially constant height between the first and second ends. The intermediate section thereby forms a flat portion of the respective recesses adjacent the interface ends of the respective blade modules.

One or more interface plates are preferably provided in the mould to separate the first and second portions. This allows the first and second modules to be formed as separate parts in the same mould. The interface plates are arranged in a chordwise direction of the mould, perpendicular to the longitudinal directional of the mould. The interface plates are preferably in the form of bulkheads. The interface plates may be part of the mould tool. However, in preferred embodiments the interface plates are intended to form a component part of the blade modules, such as the interface plates discussed previously in relation to the modular wind turbine blade. The method may therefore comprise arranging one or more interface plate(s) in the mould.

Preferably first and second interface plates are arranged in the mould in abutment at the interface between the first and second portions of the mould surface. This arrangement is referred to herein as a double-bulkhead. To ensure that the interface plates remain separate during the moulding process, for example during a resin infusion stage, a suitable release layer may be provided between the plates, or the plates may be coated with polytetrafluoroethylene (PTFE) or other suitable non-stick material that resin does not tend to adhere to.

Preferably the interface plates include one or more cut-outs in an outer periphery. The cut-outs are arranged to accommodate a connecting member when the blade modules are assembled to form the modular blade. The interface plates are preferably arranged in the mould such that the cut-outs are positioned over the flat portion(s) of the elongate protruding feature(s).

In the method, the end portion of the spar structure may be supported directly or indirectly on the inclined upper surface of the elongate feature. In preferred embodiments, the one or more first layers are arranged between the end portion of the spar structure and the inclined upper surface of the elongate feature such that the outer skin is continuous, including inside the elongate recess.

The one or more second layers of fibrous material may be arranged directly or indirectly on top of the one or more first layers and/or the elongate spar structure. In preferred embodiments, further structural material may be arranged on top of the one or more first layers and/or on top of the elongate spar structure prior to arranging the one or more second layers. The further structural material is preferably core material, for example panels of foam, balsa or honeycomb. The core material is preferably arranged on top of the one or more first layers, and alongside the spar structure, in certain regions of the outer shell such that the outer shell of the blade module has a sandwich-panel structure in these regions.

It will be appreciated that the blade mould used in the above method has a novel configuration.

Accordingly, the present invention also provides a mould assembly for making a modular wind turbine blade, the mould assembly comprising:
- a mould surface shaped to form at least part of an outer shell of a first blade module of the modular wind turbine blade; and
- and an elongate feature protruding from the mould surface, the elongate feature having a tapered end region defining an inclined upper surface for supporting a portion of a spar structure to be embedded in the outer shell of the first blade module;
- wherein a first end portion of the elongate structure tapers in height relative to the mould surface.

As discussed above, the elongate feature is configured to form a tapered recess in the outer shell of the first blade module.

Optional features of the mould assembly discussed above in relation to the invention when expressed in terms of a method apply equally to the invention when expressed in terms of a mould. Repetition of these features is avoided purely for reasons of conciseness.

BRIEF DESCRIPTION OF THE DRAWINGS

The present invention will now be described in further detail, by way of example only, with reference to the following figures, in which.

DETAILED DESCRIPTION

Figure 1:
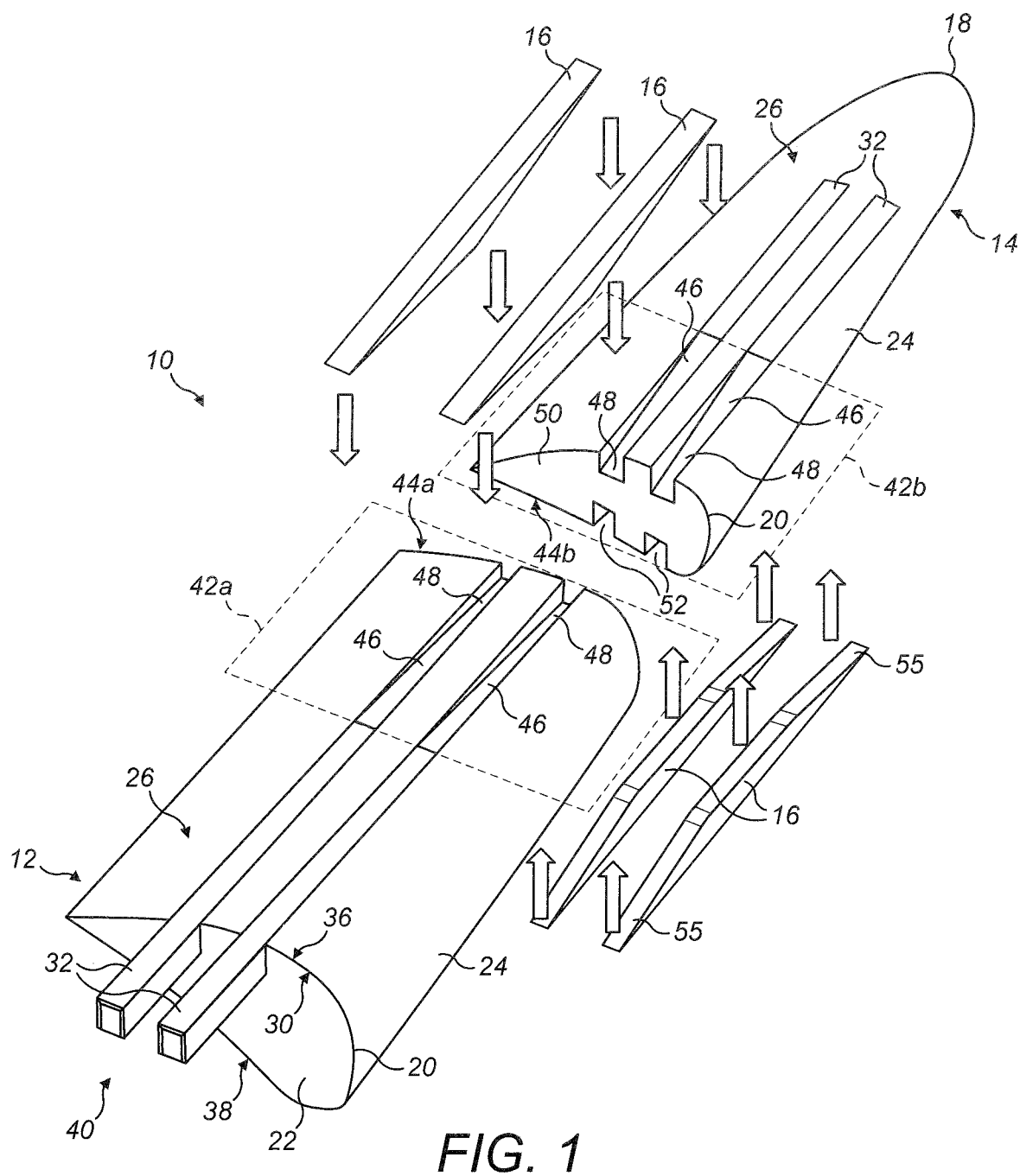
FIG. 1 is an exploded perspective view of first and second blade modules and connecting members of a modular wind turbine blade according to the present invention.

Referring to FIG. 1, this shows an exploded perspective view of part of a modular wind turbine blade 10 according to a first embodiment of the present invention. The modular wind turbine blade 10 includes first and second blade modules 12, 14, and a plurality of elongate connecting members 16 for joining the blade modules 12, 14 together.

The first and second blade modules 12, 14 form spanwise sections of the modular wind turbine blade 10. The first blade module 12 comprises an inboard section of the blade 10 and the second blade module 14 comprises an outboard section of the blade 10. The second blade module 14 in this example includes the tip 18 of the blade 10. The first blade module 12 may extend further in a radially-inward direction than shown in FIG. 1, and may include the root of the blade 10. Alternatively, the modular wind turbine blade 10 may include one or more further blade modules inboard of the first blade module 12.

Each blade module 12, 14 comprises an outer shell 20 defining a generally hollow interior 22 of the blade 10. The outer shell 20 is formed primarily from glass-fibre-reinforced plastic (GRP), and has a laminate structure comprising an outer skin 24 defining an outer surface 26 of the blade 10, and an inner skin 28 (see FIG. 2) defining an interior surface 30 of the blade 10. The inner and outer skins 28, 24 each comprise a plurality of layers of glass-fibre reinforcing fabric embedded in cured epoxy resin. Core material, such as foam panels may be provided between the inner and outer skins 28, 24 in regions of the blade 10 where increased stiffness is required.

A plurality of longitudinally-extending spar caps 32 are embedded in the laminate structure of the outer shells 20 of the respective blade modules 12, 14, between the inner and outer skins 28, 24. Each spar cap 32 comprises a stack of pultruded strips 34 of carbon-fibre reinforced plastic, referred to generally as 'carbon pultrusions' (see FIG. 2).

Referring still to FIG. 1, each blade module 12, 14 in this example includes two parallel spar caps 32 on a leeward side 36 of the blade module (the upper side shown in FIG. 1) and two parallel spar caps 32 on a windward side 38 (the lower side not visible in FIG. 1). The embedded spar caps 32 on the windward side 38 are generally not visible in FIG. 1 and have been omitted from the inboard end 40 of the first blade module 12 in FIG. 1 for ease of illustration.

Whilst not shown in FIG. 1, each blade module 12, 14 includes two longitudinally-extending shear webs located inside the outer shell 20. The shear webs are bonded along their longitudinal edges between opposed pairs of spar caps 32 on the respective windward and leeward sides 38, 36 of the blade modules 12, 14. Suitable shear webs can be seen in FIG. 10, in the context of a variant of the present embodiment.

Referring still to FIG. 1, the outer shell 20 of the first blade module 12 includes a connecting region 42a defining an interface end 44a of the first blade module 12. Similarly, the outer shell 20 of the second blade module 14 includes a connecting region 42b defining an interface end 44b of the second blade module 14. The thickness of the spar caps 32 decreases progressively in the connection regions 42a, 42b of the outer shells 20, moving towards the interface ends 44a, 44b of the respective blade modules 12, 14. In other words, the spar caps 32 have tapered end portions 46 in the connection regions 42a, 42b.

Figure 2:
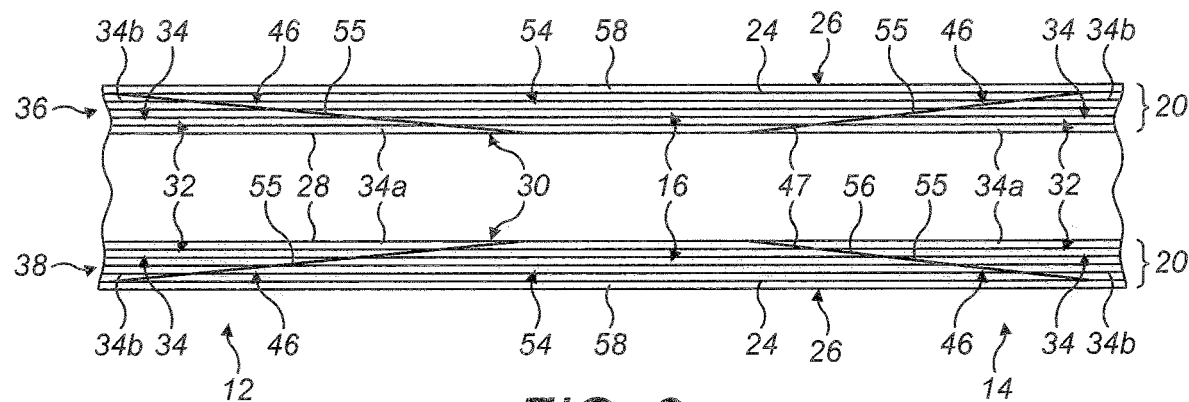
FIG. 2 is a schematic cross-sectional view of the connecting members of FIG. 1 integrated with the first and second blade modules.

The tapered end portions 46 of the spar caps 32 result from the stacked carbon pultrusions 34 each having different lengths such that they terminate at different spanwise locations relative to the interface ends 44a, 44b of the respective blade modules 12, 14 (see FIG. 2). In each stack, the lowermost carbon pultrusion 34a (closest to the inner skin 28) is longest, whilst the uppermost carbon pultrusion 34b (closest to the outer skin 24) is shortest. Each carbon pultrusion 34 of the spar cap 32 also has a tapered end 47 in the connecting region 42a, 42b of the blade module 12, 14 resulting in the tapered ends 46 of the spar caps 32 having a smooth and steady taper in the connecting regions 42a, 42b.

Referring still to FIG. 1, the tapered end portions 46 of the spar caps 32 define respective tapered recesses 48 in the outer surfaces 26 of the blade modules 12, 14 in the connecting regions 42a, 42b. The tapered recesses 48 each have a depth relative to the outer surface 26 of the respective blade module 12, 14 that increases progressively moving towards the interface end 44a, 44b of the blade module 12, 14. The tapered ends 47 of the carbon pultrusions 34 forming the spar caps 32 result in the tapered recesses 48 having a smooth and steady taper.

The interface end 44a, 44b of each blade module 12, 14 is closed by a bulkhead 50. Only the bulkhead 50 of the second blade module 14 is visible in FIG. 1. The bulkheads 50 each comprise a substantially flat plate having a shape corresponding to the cross-sectional profile of the blade modules 12, 14 at the respective interface ends 44a, 44b. As the joint between the blade modules 12, 14 is formed in an airfoil portion of the blade 10, the bulkheads 50 have substantially identical airfoil shapes. The bulkheads 50 each include four cut-outs 52 in their peripheries. The cut-outs 52 align with the tapered recesses 48 in the outer shells 20 of the blade modules 12, 14 and have a shape corresponding to the cross-sectional shape of the recesses 48 at the interface ends 44a, 44b of the blade modules 12, 14.

The connecting members 16 shown in FIG. 1 are precured composite structures. Each connecting member 16 comprises a stack of carbon pultrusions 54 integrated together by cured resin. As shown in FIG. 2, the stacked carbon pultrusions 54 are of progressively decreasing length moving through the stack, and the respective centres of the pultrusions are mutually aligned. This results in the connecting members 16 having tapered ends 55. Each connecting member 16 thereby has a double-tapered structure. Each carbon pultrusion 54 in the stack itself has tapered ends 56 which result in the tapered ends 55 of the connecting member 16 having a smooth and steady taper. The tapered ends 55 of the connecting member 16 taper in reverse to the tapered recesses 48 in the blade modules 12, 14, and are complementary in shape to the tapered recesses 48.

The modular wind turbine blade 10 is typically assembled from its constituent blade modules 12, 14 on site, for example at or near a wind farm where the blade 10 is to be installed. The assembly process involves applying a film adhesive inside the tapered recesses 48 of the respective blade modules 12, 14. A paste adhesive is also applied to the bulkheads 50. The first and second blade modules 12, 14 are then arranged together with their respective bulkheads 50 in abutment. The blade modules 12, 14 are positioned relative to one another such that their respective tapered recesses 48 are aligned. The aligned tapered recesses 48 form continuous double-tapered channels spanning the first and second blade modules 12, 14.

The connecting members 16 are complementary in shape to, and sized to fit within, the double-tapered channels formed by the aligned recesses 48. The connecting members 16 are therefore inserted respectively into the double tapered channels. Heater pads are applied to the connecting members 16 to cure the adhesive. A cap 58 of cured GRP (see FIG. 2) is subsequently bonded over the connecting members 16 to complete the outer skin 24 of the blade 10 at the interface between the respective blade modules 12, 14.

Referring to FIG. 2, this is a schematic cross section through a pair of opposed connecting members 16 when bonded in place in corresponding double-tapered channels in respective windward and leeward sides 38, 36 of the blade shell 20. It can be seen that the connecting members 16 form a bridge between the embedded spar caps 32 of the first and second blade modules 12, 14.

The connecting members 16 are also effectively embedded in the shell structures 20 of the blade 10, and results in continuous spar caps extending along the blade 10, including across the interface between the blade modules 12, 14. The connecting members 16 have a substantially identical structure to the embedded spar caps 32 of the first and second blade modules 12, 14, i.e. they are all formed from stacks of carbon pultrusions 34, 54. The resulting spar caps of the assembled blade 10 therefore have consistent load-bearing properties along their length, including across the interface between the blade modules 12, 14.

The tapered ends 55 of the connecting members 16 lie flush against the inclined surfaces of the tapered recesses 48 in the blade shell 20 and form scarf joints therewith. Accordingly, the connection between the respective blade modules 12, 14 comprises a double scarf joint. The scarf joints advantageously provide large bond areas resulting in a strong bond being achieved between the blade modules 12, 14.

The outer shells 20 of the respective blade modules 12, 14 are each formed as separate half shells in respective windward and leeward moulds of a mould assembly. The half shells are thereafter bonded together by applying adhesive along the edges of the shells 20 and closing the mould, e.g. placing the leeward mould on top of the windward mould. Shear webs are also bonded inside the blade between opposed spar caps 32.

Figure 3:
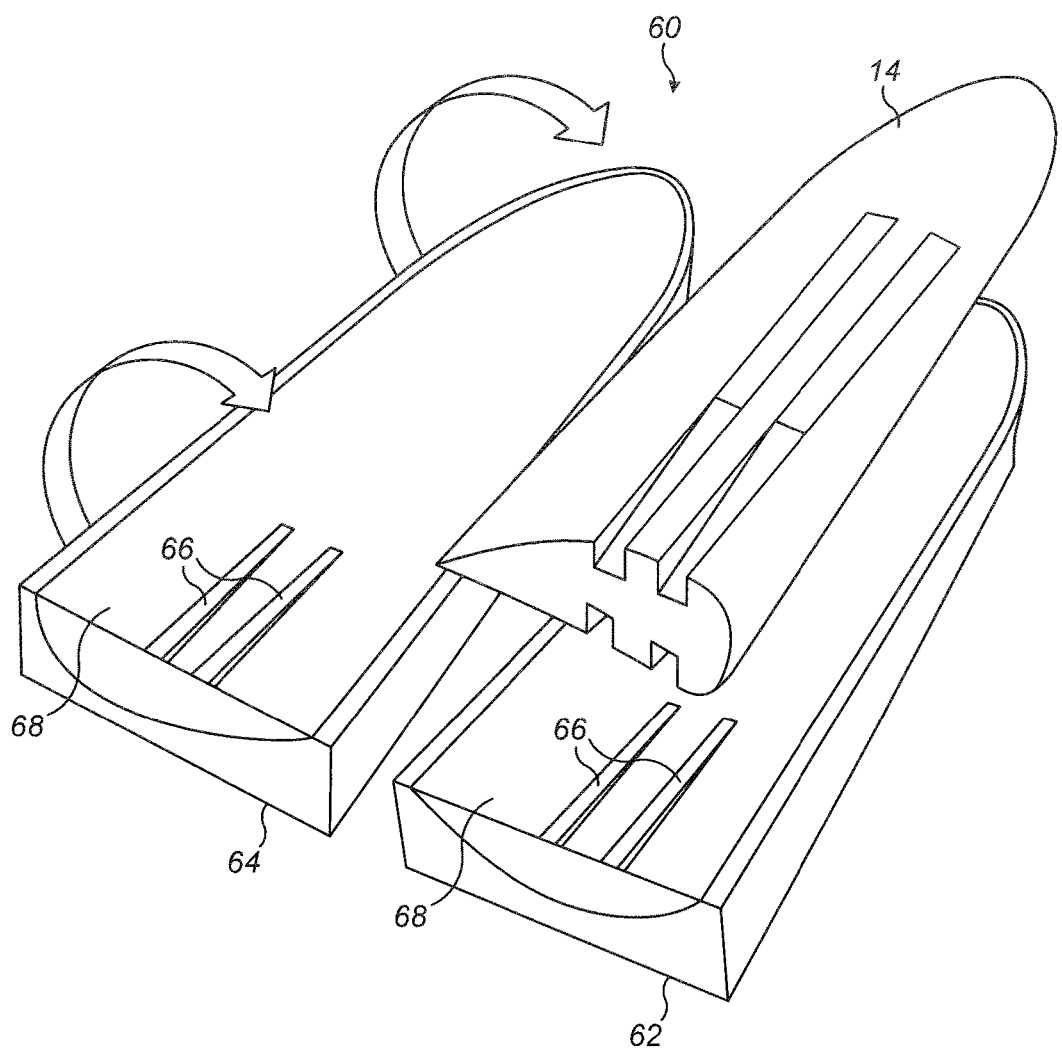
FIG. 3 shows a mould assembly for making the second blade module.

FIG. 3 shows a mould assembly 60 for making the second blade module 14 of the modular wind turbine blade 10. The second blade module 14 is also shown in FIG. 3. The mould assembly 60 comprises two mould halves: a windward mould 62 and a leeward mould 64. It can be seen in FIG. 3 that the mould halves 62, 64 each include elongate features 66 protruding from the mould surface 68. In this example, the protruding elongate features 66 are moulded bosses, which are integral with the mould surface 68. The elongate features 66 are substantially wedge-shaped tapered structures. As will be discussed in further detail later, the elongate features 66 assist in forming the tapered recesses in the blade modules 12, 14 and provide a platform for supporting the tapered ends 47 of the carbon pultrusions 34 during layup of the outer shell 20.

A moulding process according to the present invention for making blade modules will now be described in further detail with reference to FIGS. 4 to 10. In the following method, first and second blade modules are formed in the same mould assembly. The blade modules are variants of the blade modules 12, 14 described above, in that they comprise a single spar cap on each side of the blade module.

Figure 4:
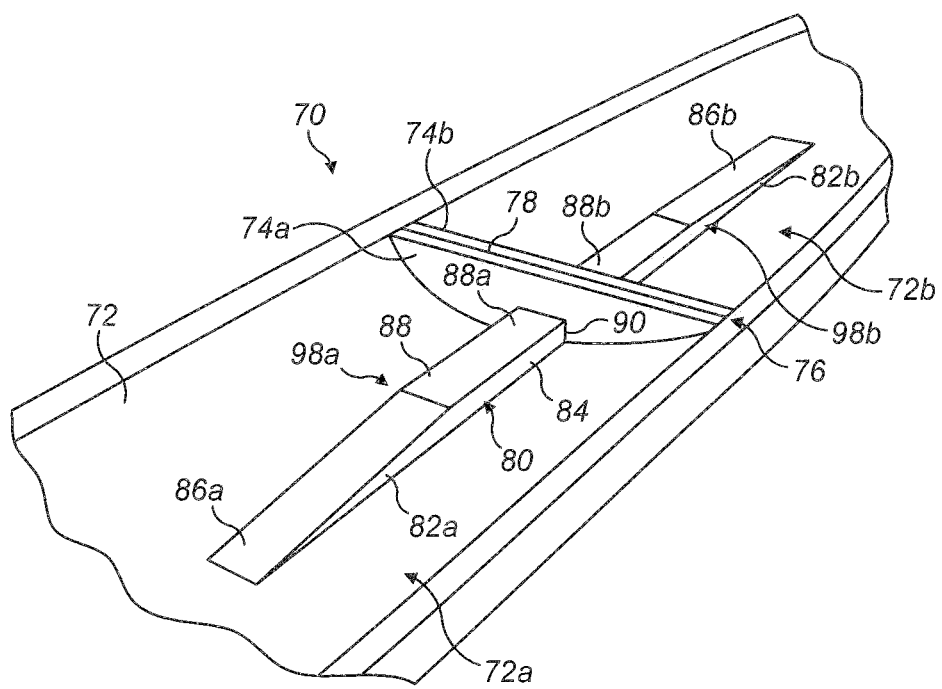
FIGS. 4 to 10 show a series of steps involved in manufacturing blade modules according to the present invention, in which first and second blade modules are formed in the same mould.

FIG. 4 shows a mould 70 for making windward half shells of first and second blade modules of a modular wind turbine blade. A corresponding mould (not shown) is used to form leeward half shells of the first and second blade modules. The windward and leeward moulds are part of the same mould assembly. The moulding method will be described in relation to the windward half shells but it will be appreciated that an identical method is used to form the leeward half shells of the blade modules.

Referring to FIG. 4, the mould 70 comprises a mould surface 72 divided into inner and outer spanwise sections 72a, 72b, which are shaped to form the windward half shells of the first and second blade modules respectively. The spanwise sections 72a, 72b of the mould 70 are separated by a double-bulkhead, comprising a pair of bulkheads 74a, 74b arranged face-to-face at an interface 76 between the mould sections 72a, 72b. Each bulkhead 74a, 74b extends in a chordwise direction across the width of the mould 70 and has a half-airfoil shape. A non-stick layer 78 is provided between the abutting faces of the respective bulkheads 74a, 74b. This may be a separate layer, such as a PTFE layer or a coating, such as a PTFE coating, applied to one or both abutting faces of the respective bulkheads 74a, 74b.

The mould 70 includes an elongate feature 80 protruding upwardly from the mould surface 72. The elongate feature extends in a spanwise direction across the interface 76 between the inner and outer sections 72a, 72b of the mould 70. The elongate feature 80 may be an integrally-moulded feature of the mould surface 72. In which case, the elongate feature 80 is a permanent feature of the mould 70. Alternatively, the elongate feature 80 may be laid up separately in the mould 70. In this case, the elongate member 80 is preferably secured to the mould surface 72, e.g. bonded to the mould surface 72. This advantageously allows conventional blade moulds to be used to form modular wind turbine blades without permanent modification of the moulds being required. Accordingly, a given mould can be used to form both modular wind turbine blades and single-piece blades.

In certain embodiments, the elongate feature 80 may be an elongate connecting member, which is removed from the mould 70 after the blade modules have been formed and subsequently used to connect the blade modules together. Such an elongate connecting member may correspond to the elongate connecting members 16 described above with reference to FIGS. 1 and 2, for example it may comprise a pre-cured stack of carbon pultrusions.

The elongate feature 80 has a double-tapered structure comprising first and second tapered ends 82a, 82b and an intermediate portion 84 of substantially constant height relative to the mould surface 72 between the first and second ends 82a, 82b. The first and second tapered ends 82a, 82b each steadily decrease in height relative to the mould surface 72 moving away from the intermediate portion 84; expressed in other terms, the tapered ends 82a, 82b each steadily increase in height moving towards the interface 76 between the inner and outer mould sections 72a, 72b.

The tapered ends 82a, 82b of the elongate feature 80 define inclined upper surfaces 86a, 86b in the respective inner and outer sections 72a, 72b of the mould 70, whilst the intermediate portion defines a flat (i.e. non-inclined) upper surface 88 between the tapered ends 82a, 82b. The flat upper surface 88 of the elongate feature 80 extends across the interface 76 between the inner and outer sections 72a, 72b of the mould 70.

The bulkheads 74a, 74b each include a cut-out 90 in their outer peripheries adjacent the mould surface 72. The cut-outs 90 correspond in shape to the cross-sectional shape of the intermediate portion 88 of the elongate feature 80. The bulkheads 74a, 74b are arranged over the elongate feature 80 such that the cut-outs 90 accommodate the intermediate portion 84 of the elongate feature 80. Expressed in other terms, the intermediate portion 84 of the elongate feature 80 extends through the cut-outs 90 in the bulkheads 74a, 74b. Accordingly, the elongate feature 80 includes flat upper surface portions 88a, 88b immediately adjacent the bulkheads 74a, 74b in the respective inner and outer sections 72a, 72b of the mould 70; in other words, the flat portions 88a, 88b are located immediately adjacent to, and on both sides of, the interface 76 between the mould sections 72a, 72b.

The elongate feature 80 in this example is a common elongate feature 80 spanning the interface 76 between the inner and outer sections 72a, 72b of the mould 70. However, in other embodiments separate elongate features may be provided respectively in the inner and outer mould sections 72a, 72b.

After setting up the mould 70 as shown in FIG. 4, the next stage in the process involves applying a gel coat (not shown) to the mould surface 72. Following application of the gel coat, one or more first layers comprising glass-fibre plies (not shown) are arranged in the mould 70 to form the outer skins of the respective blade modules. The first layers are arranged over the top of the elongate feature 80 in both sections 72a, 72b of the mould 70. In some embodiments, the first layers include pre-shaped caps made from glass fabric, which cover the elongate feature 80. The caps are pre-shaped to fit over the elongate feature 80. The conformance of the caps with the elongate feature 80 reduces the likelihood of wrinkles or other imperfections forming in the outer skin layers during the moulding process.

Figure 5:
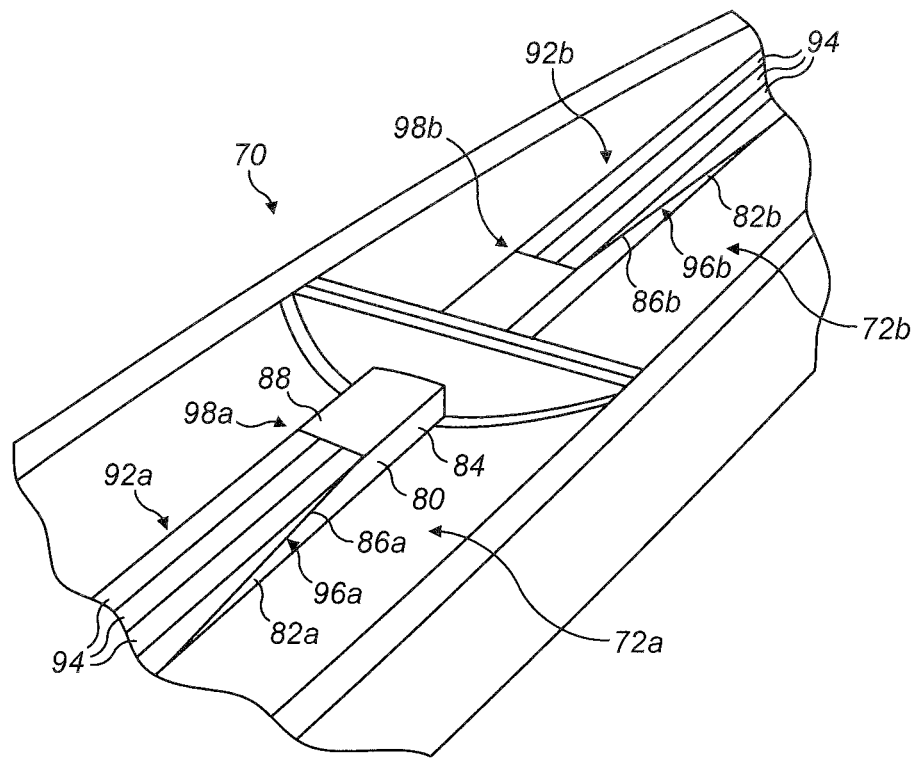

Referring now to FIG. 5, after the outer skin layers have been arranged in the mould 70, the spar caps 92a, 92b are laid up. This process involves stacking a plurality of carbon pultrusions in the mould 70. As can be seen in FIG. 5, a single spar cap 92a, 92b is laid up substantially centrally in each section 72a, 72b of the mould 70. The spar caps 92a, 92b each comprise three stacks 94 of pultrusions. Accordingly, six stacks 94 of pultrusions are arranged in the mould 70, in total, to form the respective spar caps 92a, 92b of the windward shells of the first and second blade modules. The stacks 94 of pultrusions are arranged side-by-side to form the spar caps 92a, 92b. In this example, each stack comprises five carbon pultrusions stacked on top of one another. Accordingly, each spar cap 92a, 92b is made up of fifteen pultrusions, hence thirty pultrusions in total are arranged in the mould 70.

Each of the carbon pultrusions preferably has a tapered end, and the pultrusions in each stack 94 are of different lengths, with the lengths of the pultrusions increasing progressively moving up the stacks 94. Accordingly, the method of laying up the spar caps 92a, 92b involves arranging the shortest pultrusions in the mould 70 first, and then stacking pultrusions of progressively increasing length on top. This results in the spar caps 92a, 92b having tapered ends 96a, 96b.

In each spanwise section 72a, 72b of the mould 70, the tapered ends of the carbon pultrusions are stacked on top of the inclined surfaces 86a, 86b of the elongate feature 80. The lengths of the carbon pultrusions in each stack 94 are selected such that the tapered end 96a, 96b of the spar cap 92a, 92b tapers in reverse to the respective tapered end 82a, 82*b* of the elongate feature 80 on which it is supported. The inclined upper surfaces 86*a*, 86*b* of the elongate feature 80 therefore support the tapered ends 96*a*, 96*b* of the spar caps 92*a*, 92*b*. Expressed in other terms, the tapered ends 96*a*, 96*b* of the spar caps 92*a*, 92*b* are built up on top of the inclined surfaces 86*a*, 86*b* of the elongate feature 80. The dimensions of the elongate feature 70 are selected such that the uppermost pultrusions in the stacks 94, i.e. the pultrusions that are arranged last in the mould 70, are substantially flush with the flat upper surface 88 of the intermediate portion 84 of the elongate feature 80. These uppermost pultrusions terminate at respective boundaries 98*a*, 98*b* between the inclined upper surfaces 86*a*, 86*b* and the flat upper surface 88 of the elongate feature 80.

Figure 6:
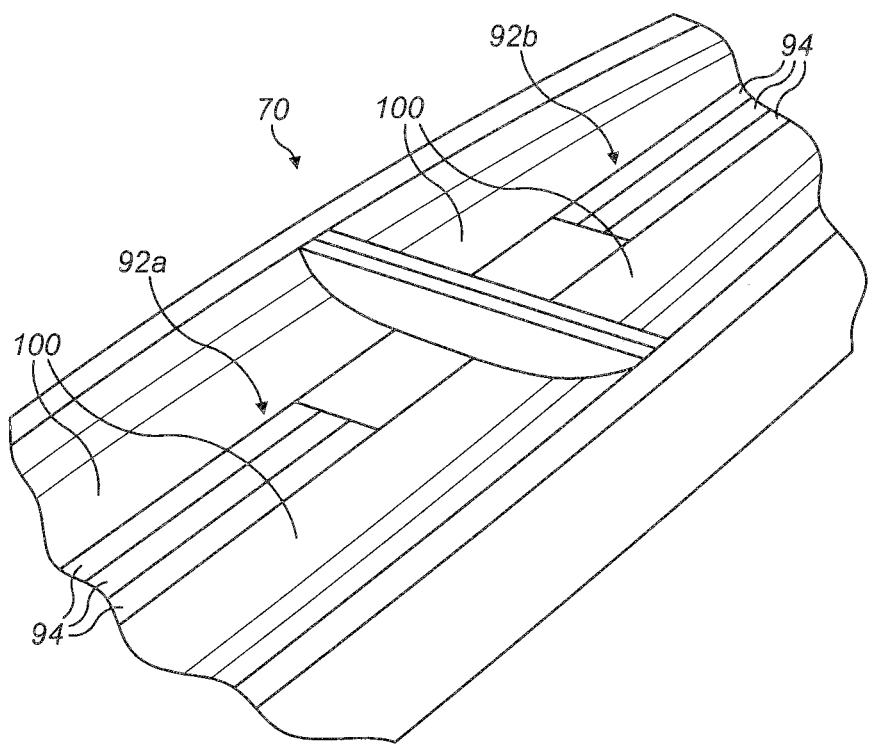

Referring now to FIG. 6, once the pultrusions have been arranged in the mould 70 to form the spar caps 92*a*, 92*b*, foam panels 100 are arranged in the mould 70 adjacent to the stacks 94 of pultrusions. The foam panels 100 form sandwich-panel cores in the overall laminate structure of the shell.

Figure 7:
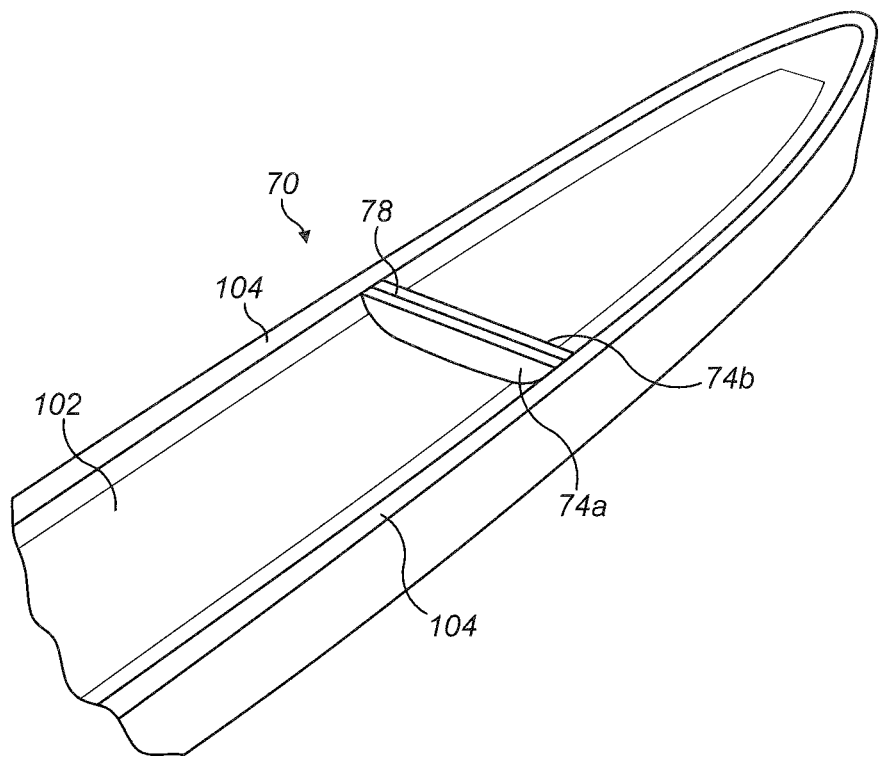

Referring now to FIG. 7, after arranging the foam panels 100, one or more second layers 102 comprising glass-fibre plies are arranged in the mould 70 over the foam panels 100 and the pultrusions forming the spar caps 92*a*, 92*b*. The second layers 102 form the inner skins of the respective outer shells of the first and second blade modules.

Once the second layers 102 forming the inner skins have been arranged in the mould 70, the shell layup is complete. The mould 70 is then covered with a vacuum film (not shown), which is sealed against the mould flanges 104 to form a sealed region encapsulating the shell layup. Air is withdrawn from the sealed region to form an effective vacuum inside the sealed region. The layup is then subject to a resin-infusion process, whereby epoxy resin is admitted into the evacuated sealed region. Resin inlets are provided in the vacuum film in both the inner and outer sections 72*a*, 72*b* of the mould 70. The epoxy resin flows throughout the layup, between the inner and outer skin layers, the spar cap pultrusions, the foam panels 100 and the bulkheads 74*a*, 74*b*. Heat is then applied to cure the resin and integrate the various shell components together. This completes the moulding process for the windward shells of the first and second blade modules. The vacuum film is then removed.

The moulding process described above results in the bulkheads 74*a*, 74*b* being integrated with the windward half shells of the first and second blade modules respectively. The non-stick layer 78 between the bulkheads 74*a*, 74*b* ensures that the interface between the bulkheads remains substantially free of resin during the infusion process. This results in the windward shells of the first and second blade modules being formed as separate units, albeit in the same mould 70.

The leeward half shells of the first and second blade modules are formed in the corresponding leeward mould (not shown) of the mould assembly following substantially the same layup and infusion procedure as described above in relation to the windward half shells. Accordingly, the leeward shells of the first and second blade modules include corresponding integrated bulkheads.

Figure 8:
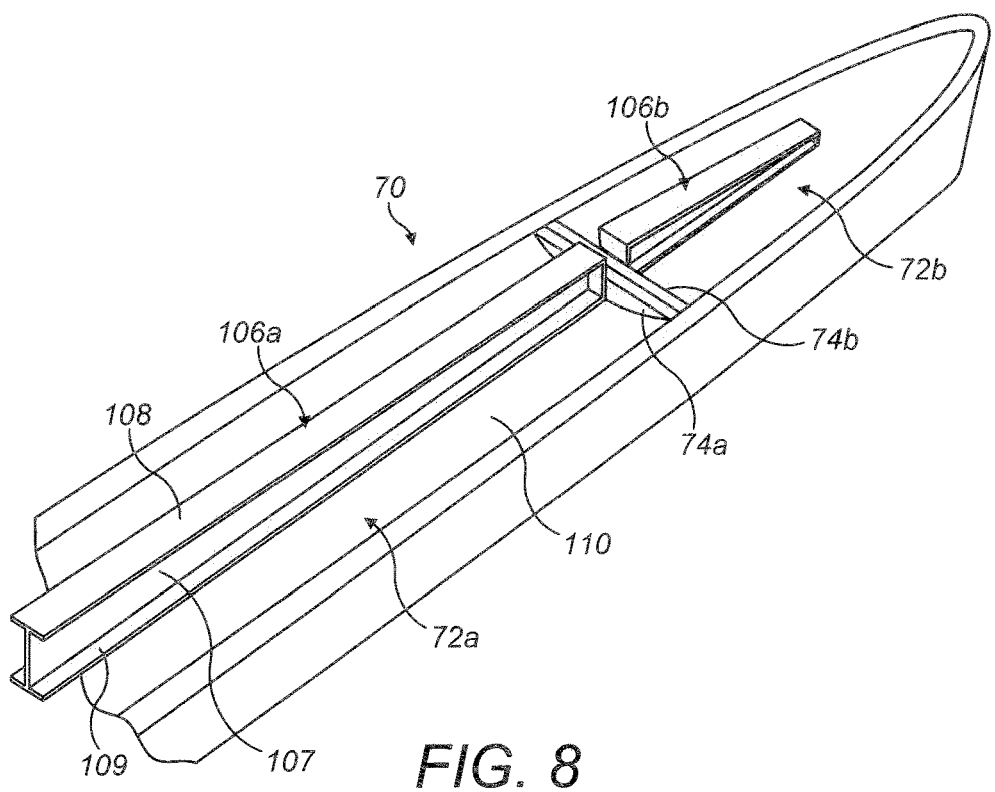
Figure 9:
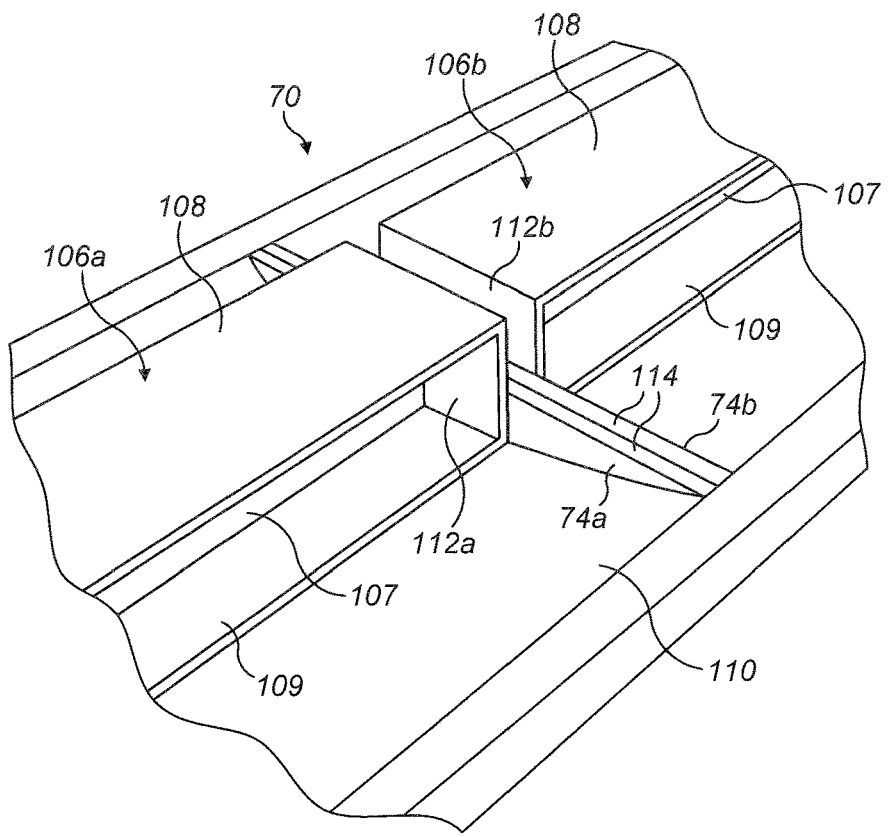

Referring now to FIGS. 8 and 9, the next step in the manufacture of the blade modules involves loading shear webs 106*a*, 106*b* into the windward mould 70. A first shear web 106*a* is loaded into the inner section 72*a* of the mould 70 and a second shear web 106*b* is loaded into the outer section 72*b* of the mould 70. Each shear web 106*a*, 106*b* extends longitudinally in a spanwise direction and has an I-shaped cross-section comprising a vertical web 107 disposed between upper and lower horizontal flanges 108, 109 (in the orientation of the shear webs shown in the drawings). Prior to loading the shear webs 106*a*, 106*b*, adhesive is applied to the inner skin 110 of the windward shells in the region of the spar caps 92*a*, 92*b*. The shear webs 106*a*, 106*b* are then positioned directly over the embedded spar caps 92*a*, 92*b* and lowered onto the adhesive. The lower flanges 109 of the shear webs 106*a*, 106*b* are thereby bonded to the windward spar caps 92*a*, 92*b*.

As shown most clearly in FIG. 9, the shear webs 106*a*, 106*b* each have a box-end 112*a*, 112*b*, which is arranged in abutment with the respective bulkheads 74*a*, 74*b*. The box-ends 112*a*, 112*b* comprise a flat surface arranged in a plane perpendicular to both the vertical web 107 and horizontal flanges 108, 109 of the shear webs 106*a*, 106*b*. Adhesive is applied to the box-ends 112*a*, 112*b* of the shear webs 106*a*, 106*b* prior to loading the shear webs 106*a*, 106*b* into the mould 70. The adhesive serves to bond the shear webs 106*a*, 106*b* to the respective bulkheads 74*a*, 74*b*.

Once the shear webs 106*a*, 106*b* have been bonded to the respective windward half shells, further adhesive is provided along the upper flanges 108 of the shear webs 106*a*, 106*b*, and along straight upper edges 114 of the respective bulkheads 74*a*, 74*b*. Adhesive is also applied along the leading and trailing edges of the respective windward shells.

Figure 10:
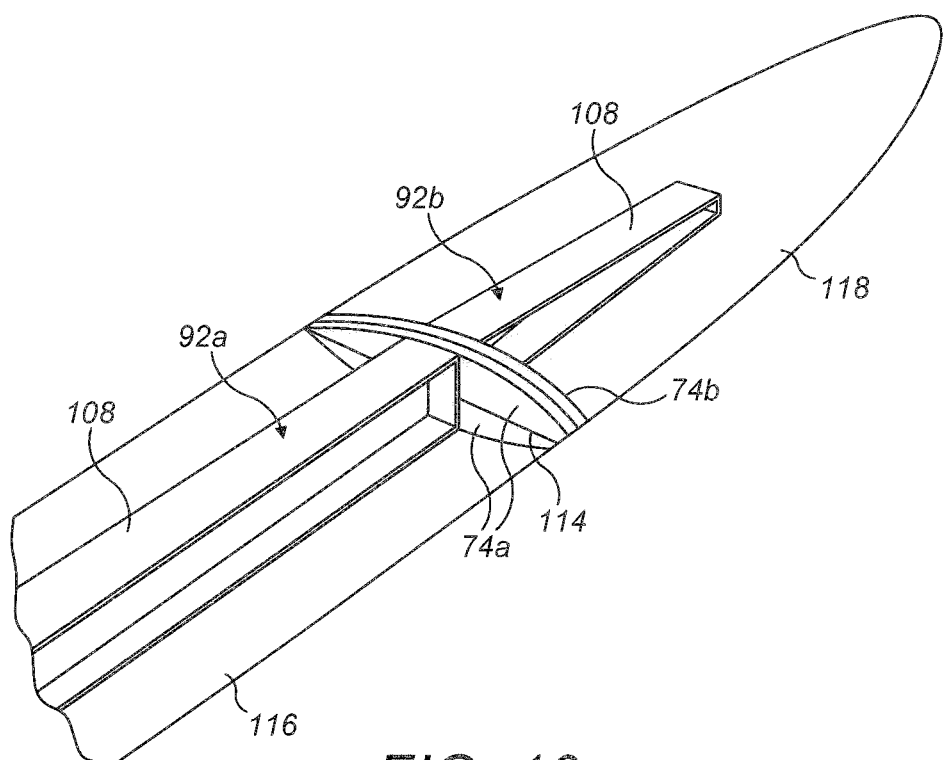

Referring now to FIG. 10, the mould assembly is then closed by lifting and turning the leeward mould and positioning it on top of the windward mould. It should be noted that the moulds and the outer skins are not shown in FIG. 10 for ease of illustration. In this position, the windward shells of the first and second blade modules 116, 118 are bonded respectively to the leeward shells of the first and second blade modules 116, 118. The upper flanges 108 of the shear webs 92*a*, 92*b* are bonded to the leeward spar caps (not shown) and the straight edges 114 of the windward and leeward bulkheads 74*a*, 74*b* of the respective blade modules 116, 118 are bonded together. This completes the blade module production process.

In the assembled blade, shear loads carried by the shear web 106*b* in the second blade module 108 are transferred to the shear web 106*a* in the first blade module through the box ends 112*a*, 112*b* and the bulkheads 74*a*, 74*b*.

Figure 11:
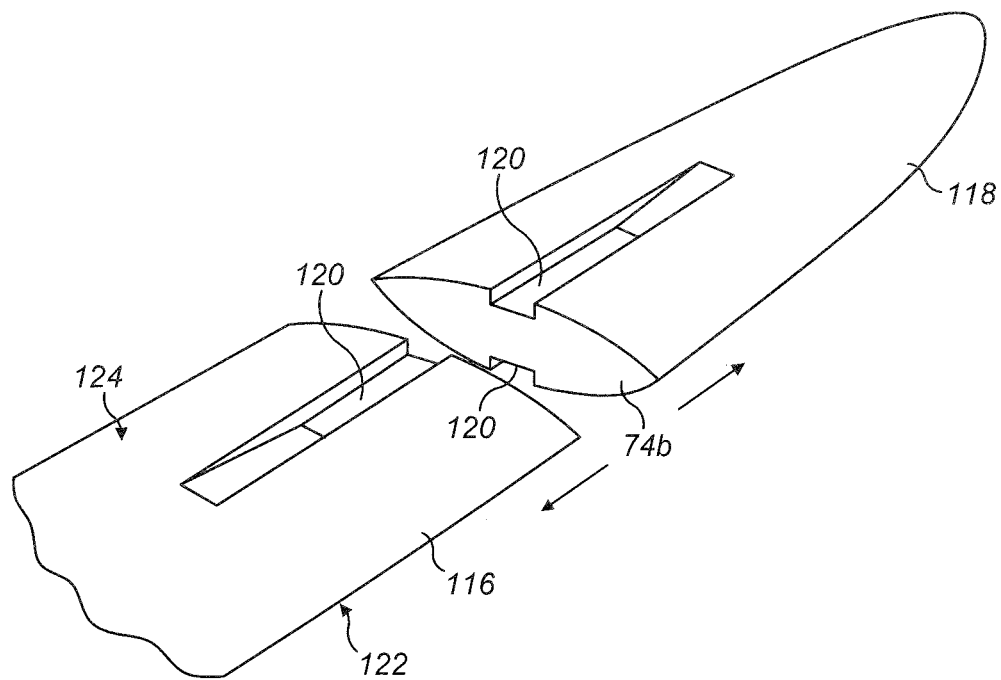
FIG. 11 shows the first and second blade modules arranged end-to-end for connection together.

Referring now to FIG. 11, once the windward and leeward shells have been bonded together, the first and second blade modules 116, 118 are removed from the mould assembly. As shown in FIG. 11, as a result of the moulding process described above, the blade modules 116, 118 each include moulded tapered recesses 120 in their outer shells. In this example, each blade module 116, 118 includes a single recess on its windward side 122 and a single recess on its leeward side 124.

The moulding process described above can also be used to form the modular wind turbine blade shown in FIG. 1, the only difference being that each blade module would include two spar caps and hence each section 72*a*, 72*b* of the mould 70 would comprise two elongate tapered formations on which the spar caps are built up in the mould, similar to the arrangement shown in FIG. 3

Referring still to FIG. 11, the blade modules 116, 118 are separate parts, which are suitably-sized to facilitate transportation to an assembly site, such as a wind farm location. On site, the blade modules 116, 118 are arranged together, in the same way as described previously with reference to FIG. 1, such that the tapered recesses 120 of the first blade module 116 align with the tapered recesses 120 of the second blade module 118 to form continuous double-tapered channels. Connecting members substantially identical to the connection members described previously in relation to FIGS. 1 and 2 are then bonded in place inside the channels, as described previously.

Figure 12:
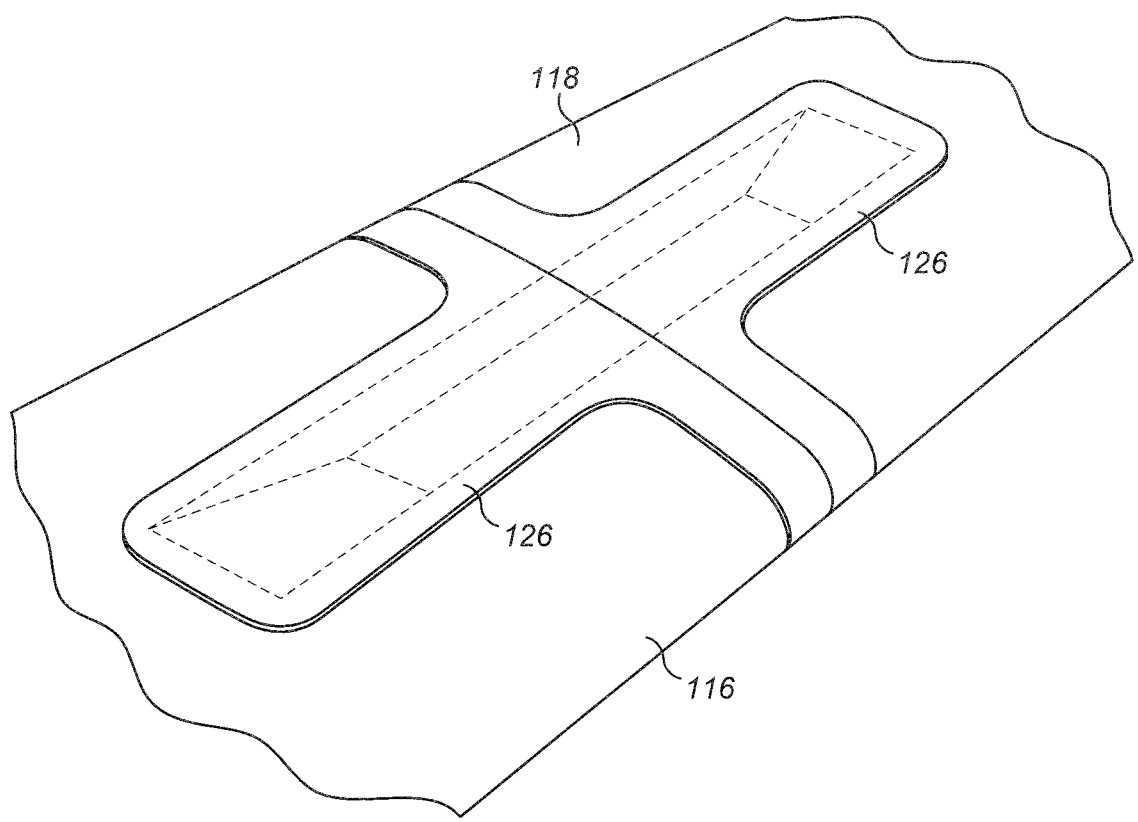
FIG. 12 shows a cap bonded over the connecting members at the interface between connected first and second blade modules.

Referring to FIG. 12, once the connecting members have been bonded in place, the outer skin of the blade is completed by bonding one or more pre-cured GRP caps 126 over the connecting elements. The caps 126 in this example are also shaped to cover the exposed peripheral edges of the bulkheads.

Many modifications may be made to the above embodiments without departing from scope of the present invention as defined in the following claims.

The invention claimed is:

1. A method of making one or more blade modules of a modular wind turbine blade, the method comprising:
   providing a mould assembly comprising a mould having a mould surface shaped to define at least part of an outer shell of a first blade module, and an elongate feature protruding from the mould surface, the elongate feature having a tapered end region defining an inclined upper surface;
   arranging one or more first layers of fibrous material on the mould surface to form an outer skin of the first blade module, the one or more first layers at least partially covering the elongate feature;
   arranging an elongate spar structure on top of the one or more first layers, the elongate spar structure having a tapered portion that tapers in reverse to the tapered end region of the elongate feature;
   arranging the tapered portion of the elongate spar structure on top of the inclined upper surface of the elongate feature;
   arranging one or more second layers of fibrous material on top of the one or more first layers and on top of the elongate spar structure to form an inner skin of the first blade module;
   integrating the one or more first layers, the one or more second layers and the elongate spar structure by means of a curable matrix material;
   curing the matrix material to form the outer shell of the first blade module;
   wherein the elongate feature of the mould assembly forms a tapered recess in the outer shell of the first blade module.

2. The method of claim 1, further comprising forming the spar structure by stacking one or more strips of fibre-reinforced material in the mould such that an end portion of each strip is supported on top of the inclined upper surface of the protruding elongate feature.

3. The method of claim 2, further comprising forming the tapered end portion of the spar structure by stacking strips of progressively increasing length in the mould.

4. The method of any of claim 1, further comprising forming the first blade module and a second blade module respectively in adjacent first and second spanwise portions of the same mould assembly.

5. The method of claim 4, further comprising forming a tapered recess in an outer shell of the first blade module and a tapered recess in the outer shell of the second blade module by means of a common elongate protruding feature spanning the first and second portions of the mould assembly.

6. The method of claim 4, further comprising arranging first and second interface plates in the mould in abutment at an interface between the first and second spanwise portions.

7. The method of claim 6, further comprising providing a non-stick coating on one or both abutting surfaces of the interface plates, and/or providing a release layer between the interface plates.

8. The method of claim 1, wherein the elongate feature is an integrally-moulded feature of the mould surface.

9. A method of forming a modular wind turbine blade from first and second blade modules, wherein the method comprises:
   forming the first and second blade modules according to the method of claim 4
   arranging the first and second blade modules end-to-end with their respective interface ends in abutment and their respective tapered recesses aligned to form a continuous double-tapered channel spanning the connecting regions of the first and second blade modules;
   providing an elongate connecting member having a double-tapered structure comprising first and second tapered ends, the double-tapered structure being complementary in shape to the double-tapered channel;
   inserting the elongate connecting member into the double-tapered channel; and
   bonding the elongate connecting member in the double-tapered channel.

10. The method of claim 9, further comprising applying adhesive to the channel and/or to the elongate connecting member prior to inserting the connecting member in the channel.

11. The method of claim 9, wherein the blade modules each include an interface plate at their respective interface ends, and the method comprises bonding the respective interface plates together by means of adhesive.

12. The method of claim 9, further comprising bonding a cap over the connecting member.

* * * * *